United States Patent Office 3,383,592
Patented May 14, 1968

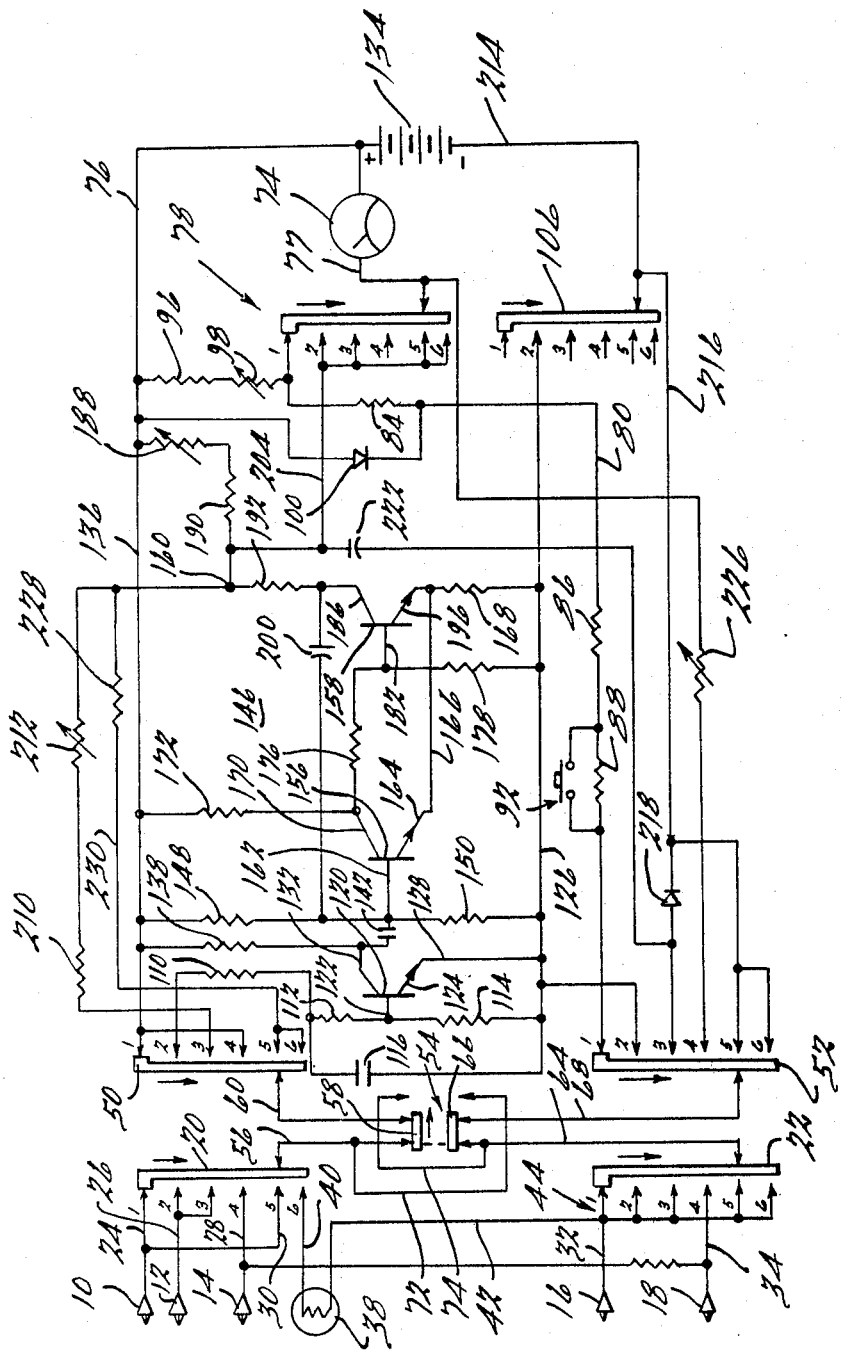

3,383,592
AUTOMOTIVE TESTING APPARATUS FOR MEASURING VOLTAGE, FREQUENCY, DWELL TIME, CURRENT AND IMPEDANCE
Robert D. Williamson, Warren, Mich., assignor to Merc-O-Tronic Instruments Corporation, Almont, Mich., a corporation of Michigan
Filed Aug. 16, 1965, Ser. No. 479,933
10 Claims. (Cl. 324—73)

This invention relates generally to testing apparatus and, more particularly, to a multifunction test apparatus which is adapted to be utilized in testing and adjusting various components and elements of the operating portions of an internal combustion engine.

In tuning and adjusting components of an internal combustion engine, it has been the practice in the past to utilize individual test apparatuses to perform the various test functions necessary in mechanically and electrically testing and adjusting an internal combustion engine. In this situation it is necessary, in the prior art devices, to connect the individual test apparatus with the component of the engine which is under test to obtain a reading of the condition of that component. However, when it is desired to refer back and forth between the various test apparatuses to correlate, for example, engine speed with dwell, voltage output of the generator with engine speed and other various interrelated systems, it was necessary to refer back and forth between the several pieces of equipment. Accordingly, a need has arisen for a single piece of equipment which will perform the various test functions required in the testing and adjusting of various systems of an internal combustion engine, including the electrical system, whereby it is only necessary to operate a single switch to refer to conditions existing in the various systems of the engine.

With the system of the present invention, a single piece of equipment has been provided which will enable the user to read the voltage in any portion of the system with a voltmeter, the engine speed by means of a tachometer, the percentage of dwell by means of a dwell circuit, the current through any circuit elements, as for example, the output of a generator, alternator or any conductor within the system. The test apparatus of the present invention is further adapted to measure the resistance of any of the circuit elements, for example, the field windings of the alternator, the generator or the coil resistance of the spark coil, and finally the system may be utilized to measure either pressure or vacuum within the engine through the use of suitable pressure or vacuum transducers, as are known in the art. The equipment has been provided with a multi-position switch, which enables the user to switch to the various functions of the test equipment and thereby measure the operation of the particular circuit in question. Also, a reversing switch has been provided to enable the operator to connect the equipment to the electrical circuit of the internal combustion engine and then compensate for a positive or negative ground of the engine electrical system.

With the switch in the first position, a voltmeter circuit is energized and the voltage of any of the circuit elements may be measured, as for example, the solenoid voltage, certain ignition voltages, the battery voltage, etc. The circuit illustrated, shown only in one preferred embodiment, generally contains a voltmeter in series with a current limiting resistor and a scale resistor, the latter resistor being adapted to be taken out of circuit to enable the user to change from one scale to another, as for example, to change from 1.6 volts to 16 volts DC. The circuit is further provided with a variable impedance in shunt circuit with the meter coil which damps sudden movements of the coil. The circuit is further provided with a voltage limiting means which acts as a protection for the voltmeter in the sense that the protection device will present no more than a predetermined maximum voltage to the meter, which has been chosen to be within the safe overload range of the meter.

In the specific example illustrated in the drawings, a diode has been placed in shunt relation to the voltmeter coil, the diode being of such characteristics that it will not conduct until approximately 300 millivolts is present at the input terminals and remains at a constant 500 millivolts or acts as a constant voltage or a voltage limiting source when the diode is full on. Thus, it is seen that the operating voltage of the meter, within the measuring range, has been chosen to be a value less than the turn-on value of the diode. Thus, the diode will be out of circuit during the critical measuring range of the meter and will be in circuit to effect a limiting of the voltage to the meter in the event that the meter is being overloaded.

The second switch position in the test unit is provided to allow the user to sense the engine speed of the internal combustion engine by means of a tachometer circuit which is in pulse sensing relation to the ignition system of the engine. The tachometer circuit has been so designed as to be sensitive to low amplitude input pulses thereby enabling the circuit to be used in conjunction with a normal make-and-break type of ignition system or with a purely pulsing system. This latter system includes the situation where the ignition system in energized and de-energized by a plurality of pulses generated in response to the engine speed, generally by means of semiconductor pulsing.

The tachometer circuit generally comprises an input isolation stage which operates to isolate extraneous noise or "hash" from the main portion of the tachometer circuit. This isolation stage is provided to act as a constant current source in its production of pulses in response to the input signals. The output of the isolation stage is fed through a differentiating circuit to a monostable circuit, as for example, a monostable multivibrator, which produces a constant amplitude, constant duration output pulse. The width of the output pulse from the multivibrator remains constant due to the inherent time constant of the multivibrator circuit, and the amplitude remains constant due to the saturation of the output transistor and the manner in which the output pulses are coupled to an output integrating circuit.

Thus, a series of constant energy pulses are produced, the integration of which generates an output signal having a characteristic which varies in accordance with the frequency of the output signals produced. In the preferred embodiment, an integrator is provided at the output terminals which takes the form of a meter to read the average energy of the output pulses, the average varying in accordance with the frequency of pulses received. Protection has been provided in the meter circuit by choosing a meter which will provide a full scale reading at sixty percent duty cycle, that is, wherein the pulses are on for sixty percent of the time and off for forty percent of the time. Accordingly, a one hundred percent duty cycle will overload the meter by a factor of eighty percent which is within the safe range for meters utilized in this field. However, this overload factor may be varied in accordance with the desires of the user by varying the full scale deflection of the meter.

The third position of the equipment switch provides a dwell reading which is adapted to read the dwell in percent of dwell. The percent of dwell indicates the percent of time that the points of the ignition system are closed or, correspondingly, the time that the pulses of an ignition system are on. A simple adjust for the dwell circuit has been provided wherein the input leads are merely shorted and the meter is then adjusted for full scale reading by adjusting a variable resistor in parallel circuit with the meter. This adjustment compensates for internal battery deterioration or other low voltage conditions within the equipment itself. The circuit has been so devised that a voltage block for the main ignition battery of the internal combustion engine is provided wherein the battery is blocked out during the period when the meter is being energized.

Positions 4, 5, and 6 of the switch on the equipment corresponds to an ammeter, an ohmmeter and a vacuum or pressure gauge circuit, respectively. These switch positions connect circuits which are adapted to perform various functions in testing the performance of the internal combustion engine and its associated electrical system. The various scales of the meter are accordingly calibrated in amperes, ohms and inches of mercury or pounds per square inch, in the case of the vacuum or pressure meter, respectively. The ohmmeter and the vacuum or pressure meter are provided with an internal battery wherein the common meter for these functions is calibrated for full scale deflection by shorting the input terminals together and adjusting for full scale reading on the meter. Thus, variations in internal battery voltage are compensated for prior to each use of the test equipment.

With the system of the present invention, an engine may be tested and adjusted with a single assembly whereby it is only necessary to operate a single switch to refer to the various functions of the engine and thus interrelate the operation of, for example, the speed of the engine and the output of the generator, the speed of the engine and the dwell percent, etc. With the system of the present invention, any voltage within the electrical system may be read, the engine speed and the percent of dwell of the engine may be determined, the current and resistance of any portion of the electrical circuit may also be indicated and the vacuum or pressure present in the engine may be readily calculated.

Accordingly, it is one object of the present invention to provide an improved test apparatus for testing the various function and performance capabilities of an internal combustion engine, including its electrical system.

It is another object of the present invention to provide an improved test apparatus which is capable of performing a multiplicity of test functions with a single unit.

It is still a further object of the present invention to provide an improved testing apparatus having a plurality of individual test circuits which may be sequentially energized by merely switching from one circuit to the next.

It is still another object of the present invention to provide an improved test circuit wherein certain portions of the circuit are protected during overload conditions, the protective means being normally out of circuit until such time as an overload condition is present.

It is still a further object of the present invention to provide an improved tachometer circuit wherein extraneous noise signals are eliminated from a major portion of the circuit through isolation.

It is still a further object of the present invention to provide an improved tachometer circuit which is highly sensitive to the input signals and thus enabling the circuit to be utilized in conjunction with low amplitude pulse inputs.

It is another object of the present invention to provide an improved tachometer circuit which produces output pulses of constant width and amplitude for a given engine speed.

It is still a further object of the present invention to provide an improved tachometer circuit wherein the output indicating device is protected through the inherent duty cycle operation of the circuit.

It is still another object of the present invention to provide an improved test apparatus which is rugged and reliable in use and inexpensive to manufacture.

Further objects, features, and advantages of this invention will become apparent from a consideration of the following description, the appended claims and the accompanying drawing in which the single figure is a schematic diagram illustrating the several circuits utilized in connection with testing a plurality of functions of an internal combustion engine.

Referring now to the single drawing, there is illustrated a schematic diagram of one preferred embodiment of the test unit circuitry utilizing the principles of the present invention. For purposes of simplicity, and insofar as identical elements are utilized for several different circuits, the following description will proceed in accordance with a detailed explanation of the circuit energized at each individual position of the selector switch. The circuitry as illustrated in the figure is adapted to be placed into a casing having suitable switching and adjustment knobs, as is well known in the art. The tester will accordingly be a compact, portable instrument, which is entirely self-contained with the exception of the requirement for connection to the particular points of the engine to be tested. As will be seen from the following description, a plurality of test clips have been provided to enable the operator of the device to completely connect or set up the various circuits of the test apparatus prior to its use and thereafter merely switch between the various circuits to ascertain the several characteristics of the engine in their normal operating state. Accordingly, it is unnecessary to disconnect a test lead and reconnect another test lead to another test point when it is desired to sequentially check a plurality of operating characteristics of the engine.

The test circuitry, as representatively illustrated in the figure, is adapted to be associated with the various points which are desired to be observed on the engine by means of a plurality of input test clips 10 to 18 which are associated with a pair of six-position input switches 20, 22 through a plurality of input leads 24 to 34. The sixth position on the pair of switches 20, 22 is adapted to be connected to a vacuum or pressure sensing transducer 38, which is connected by a lead 40 to the sixth position of switch 20 and by lead 42 to a plurality of common conductors 44 associated with switch 22.

As will be seen from the following description, the first input clip 10 is adapted to be utilized in association with a voltage and resistance measuring circuit, clip 12 is adapted to be utilized in association with a tachometer and dwell circuit, clip 14 is utilized in conjunction with a current measuring or ammeter circuit, and clip 18 provides the other lead for the ammeter or current measuring circuit. Clip 16 provides a common ground for all of the testing functions, with the exception of the ammeter circuit, and is commonly connected to switch 22 through the common conductors 44. The vacuum or pressure transducer may be of any type which is readily available on the market wherein the vacuum or pressure, depending on the particular use being made of the circuit, varies a resistance of the transducer element, which resistance may readily be measured. However, the invention is not intended to be so limited to such a transducer, but may include any transducer such as a voltage or current generating transducer, or the like, which varies a characteristic thereof in accordance with the magnitude of a vacuum or pressure being measured.

The outputs of the upper and lower input switches 20, 22 are fed to a pair of circuit input switches 50 and 52 through a reversing switch 54. Specifically, and with the reversing switch 54 in the position shown, the output of switch 20 is fed through conductor 56, switch blade 58 and conductor 60, to the input switch 50. Also, the output of switch 22 is fed through a conductor 64, a switching blade 66 and a second conductor 68 to the input side of input switch 52. A pair of reversing conductors 72 and 74 have been provided with contacts which are capable of being engaged by switching blades 58, 66 to reverse the input connections to switches 50 and 52. The reversing switch 54 is provided to enable the operator to simply switch between a positively grounded and a negatively grounded system by merely operating reversing switch 54. In this way, the proper polarity input signal is provided to switches 50 and 52.

With the input switches 50 and 52 in the position shown, that is with the contact engaging the first contactor of each of the switches 20, 22, 50 and 52, a voltage measuring circuit or voltmeter circuit is energized which may be utilized in measuring battery voltage, ignition voltages, solenoid voltages, and the like. Generally, the voltmeter circuit is capable of measuring from zero to 16 volts DC, and a provision has been made to enable the operator to change the scale to a zero to 1.6 volts DC. The voltage is measured by connecting test lead or clip 10 to the point at which the voltage is to be measured, and the clip 16 is grounded to the chassis. An indicating meter 74 has been provided to indicate the magnitude of the voltage which is being measured.

The meter 74 is connected to the input contact number one by means of a conductor 76 on one side thereof and the other side of the meter 74 is connected to the switch 52 through a conductor 77, a switch 78 and a conductor 80. The switch 78 is seen to be positioned such that contactor number one is engaged by the slider thereof, as was the situation with the switches 20, 22, 50, 52 described above. A plurality of resistors 84, 86 and 88 are connected in series circuit between the switch 78 and the switch 52, which tend to limit the current through the meter 74 to the operating range of the meter, thereby precluding the overloading thereof.

In one preferred embodiment, the resistors 84 and 86 are chosen to be approximately ten percent of the total resistance of resistors 84, 86 and 88. Accordingly, if resistor 88 remains in circuit with the meter, a large portion of the voltage present at the input clips will be dropped across resistors 84, 86, 88 and the meter is capable of reading a voltage of the order of 16 volts. In the situation where it is desirable to utilize a lower scale, a shorting switch 92 has been provided in shunting relation to resistor 88 to allow resistor 88 to be removed from the circuit by the operator. Accordingly, in the example given, ten times the current will flow in the series circuit through the meter to enable the operator to obtain full scale readings in the event a low voltage is being read. It is to be understood that the above values are given for illustration purposes only and the parameters of the circuit may be chosen to read any voltage desired. Inasmuch as certain surges of voltage may be experienced through the meter 74, a plurality of damping resistors 96 and 98, have been provided in shunting relation to the meter coil contained within the meter 74 to damp out sudden movements of the meter coil.

In order to protect the meter from an over-voltage condition, a diode 100 has been connected in parallel with the meter 74. The diode has been so chosen that it will not conduct in the forward direction until approximately voltage necessary to provide approximately full scale at the meter is present across the electrodes of the diode. Accordingly, the diode will be effectively out of circuit during the peak operating voltage of the meter but will conduct and act as a shunt above this operating voltage. At some overload voltage, the diode is full and protects the meter from a greater voltage drop from being impressed across the meter. This overload voltage is chosen in accordance with the overload characteristics of the meter and vary from meter to meter in accordance therewith. Thus, when the voltage across the meter exceeds the full scale voltage of the meter, the diode starts to conduct and continues to increase its conduction as the voltage at the electrodes of the diode is increased. Thus, the diode is fully in circuit at a point wherein a preselected overload voltage is impressed across the electrodes of the diode. In the embodiment having the circuit parameters discussed, the meter will be at full scale deflection at 250 millivolts, the diode 100 begins to conduct at 300 millivolts and is fully on at 500 millivolts.

Referring now to the circuit which is energized when the switches 20, 22, 50, 52 and 78 and a sixth switch 106 are moved to a position in contact with the second contact thereof. In this switch position a tachometer circuit is energized which is adapted to sense either, by conduction, the opening and closing of the engine position, by antenna action, the pulsing of an ignition circuit. The tachometer circuit is adapted to indicate the speed at which the engine is revolving by sensing the operation of the points of a distributor circuit. However, while the circuit has been illustrated and will be described as being connected to sense the opening and closing of a switch in the distributor, it is to be understood that the tachometer circuit of the present invention may be used on a pulsing type of ignition circuit wherein the contacts are eliminated and semi-conductor switches are utilized.

In the use of the tachometer circuit, the clip 12 is suitably connected to the distributor and a signal is fed through conductor 26 and switch 20 to switch 50 through the reversing switch 58. As in the situation described above, clip 16 is connected to the switch 52 through switches 22 and reversing switch 54. The input signal to switch 50 is impressed on contact number two thereof and is fed through a resistor 110 to a pair of voltage divider resistors 112 and 114. The resistors 112, 114 are connected in series, one with the other, and both resistors 112, 114 are connected in parallel with a filter capacitor 116 to eliminate "hash" or other extraneous noise signals from the input circuitry. The voltage drop across the resistor 114 is impressed on the base-emitter circuit of an NPN transistor 120, wherein a base electrode 122 is connected to the junction point between resistors 112 and 114 and the emitter electrode 124 is connected to a conductor 126 by means of a conductor 128.

It is seen that the transistor 120 is connected in common emitter configuration to provide a high impedance input and a low impedance output. Accordingly, each time a pulse is fed to the base electrode 122, the transistor 120 will be switched to the conducting state, thereby permitting current to flow therethrough. A collector electrode 132 is connected to a suitable source of direct current supply, as for example, a battery 134, by means of a conductor 136 and a collector load resistor 138. Thus, as transistor 132 is turned on, current will be drawn through resistor 138 through the collector-emitter circuit of transistor 120. Accordingly, the voltage at the collector electrode will drop to a potential such that the voltage of conductor 126 differs therefrom only by the collector-emitter voltage drop. The pulsing of base electrode 122 produces a generally square wave output pulse at collector electrode 132. This generally square wave negative going pulse is fed to a differentiating capacitor 142 which produces a negative going spike at the leading edge of the pulse at collector 132, and a positive going spike at the trailing edge of the pulse at collector electrode 132.

The output of differentiating capacitor 142 is fed to a single shot multivibrator circuit 146 through a pair of resistors 148, 150 connected thereacross. The monostable multivibrator generally consists of a normally conducting transistor 156 and normally nonconducting transistor 158, and an output pulse is derived from the monostable multivibrator circuit at node 160. The transistor 156 includes a base electrode 162 connected to a capacitor 142 and an emitter electrode 164 which is connected to a conductor 126 through a conductor 166 and a resistor 168. The base-emitter circuit of transistor 156 is back-biased by the negative spike from capacitor 142 due to the rectifying action of this junction, thereby switching transistor 156 to the nonconducting state. A collector electrode 170 is connected to the positive source of potential 134 through a resistor 172 and a conductor 136. With the transistor nonconducting, current flows through a path consisting of resistor 172 and a pair of resistors 176 and 178 connected in series therewith.

Accordingly, the second transistor 158 will be rendered conductive due to the connection of a base electrode 182 to the juncture between resistors 176 and 178 and the consequent switching of transistor 156 due to the input pulse at base electrode 162. A collector electrode 186 is connected to conductor 76 and thus battery 134 by means of a variable resistor 188, a fixed resistor 190 and a second fixed resistor 192. The calibration of the circuit by the varying of the resistor 188 will be hereinafter explained. An emitter electrode 196 of transistor 158 is connected to the resistor 168 in common with the connection of emitter 164, to provide a current path for transistor 158 to conductor 126. With the conduction of transistor 158, the charge on a capacitor 200 maintains the nonconducting state of transistor 156 until such time as the capacitor 200 is discharged, thereby rendering transistor 156 to a conductive state again, as is known in the art.

A constant width pulse is produced at the node 160 due to the switching of the monostable multivibrator from its stable to its unstable state, the width of the pulse being determined by the discharge time constant of capacitor 200. The amplitude of the pulse is also a substantially constant value due to the saturation of transistor 158 when it is switched to its conducting state. With the switch 78 in the number two position, the meter 74 is connected across the resistors 188 and 190 by means of conductor 76, switch 78, contact number two and a conductor 204. Accordingly, the meter will respond to the current pulses being passed through resistors 188, 190. The meter will integrate the pulses to give an average power reading in the output circuit due to the fact that the constant amplitude, constant width pulses are produced from the monostable multivibrator.

As stated above, the meter 74 is utilized as an integrating device to produce an indication of average power being produced by the monostable multivibrator. The production of an indication of average power is due to the constant energy pulses being produced by the multivibrator and impressed upon the meter. In order to protect the meter from very large overloads, the meter has been chosen such that at 60% duty cycle in the output pulses, will produce a full scale deflection of the meter. Accordingly, when the contacts are continuously closed, the greatest load condition, the meter will be overloaded by eighty percent, which overload condition is within the normal tolerable overload in meters normally utilized in the subject field.

Referring now to the circuit which is energized by placing the switches 20, 22, 50, 52, 78 and 106 in the number three position, a dwell circuit is energized which is capable of indicating the percentage of time that the points are closed to the percentage of time that the points are open. In a preferred embodiment of the invention, the meter 74 has a scale which is calibrated in percent of dwell or degrees of dwell. It is to be noted that during the inoperative portion of the measuring cycle, means has been provided to block out the power supply of the engine, as for example, the automobile battery, or the like. This blocking action occurs during the period when the points are open, thus, the only current flow in the test apparatus is provided by the internal battery of the test apparatus when the points are closed.

With the input switches at the number three position, clip 12, which has been connected to the distributor, feeds an input signal over conductor 26 to switch 20. The signal is then impressed on the number three conductor of switch 50 through conductors 56 and 60 and reversing switch 54. A series circuit of resistors 210, 212, the latter resistor 212 being adjustable, are provided. The resistors 210, 212 are in series with a second set of the calibrating resistors 188 and 190, and with battery 134 by means of conductor 76. The negative side of battery 134 is connected to input switch 52 through a conductor 214 and a second conductor 216, and a blocking diode 218. The blocking diode 218 is connected in circuit with the car battery by connection of the cathode electrode thereof to the positive side of the external battery. In this way the diode acts to block out the automobile battery at such time as a measurement is being taken, thereby utilizing the internal battery of the test apparatus during the read period.

A filter capacitor 222 is connected between the junction of the resistors 212, 190 and coacts with the resistors 210, 212 to provide a filter circuit to substantially eliminate any extraneous noise signals, such as "hash" from the input to the meter. When the circuit is being utilized to measure the percent of dwell, current is provided through the resistors 190, 188 by means of battery 134 when the input leads are shorted together by means of portions of the distributor. Accordingly, a plurality of current pulses will be fed through the resistors 188, 190 and the meter 74 will integrate these pulses to give an average reading, which is indicative of the percent of dwell of the engine. The initial calibration of the circuit is provided by shorting the input leads, as for example, clips 12 and 16, and adjusting resistor 188 until a full scale reading is indicated on meter 74. The current through the circuit is provided by the battery 134, which may decay after long periods of use, thus, it is necessary to initially calibrate the circuit prior to utilizing the test apparatus on the engine.

Referring now to the circuit with the switches in position number four, an ammeter circuit is energized which may be utilized in measuring the current output of a generator, alternator or other like current device, wherein input clips 14 and 18 are connected to the device to be measured. A resistor 224 is connected across the leads to shunt the greatest portion of the current being generated by the device to be measured. This resistor 224 is provided in order to lower the amount of current which is being switched by the various switches 20, 22, 50 and 52. The input current from switch 50 is provided from contactor number four thereof through conductor 136, conductor 76, meter 74, a conductor 225, and a resistor 226 to the contactor number four of switch 52. Thus current flowing into the input switches 50, 52 will also flow through meter 74 and a reading which is indicative of the magnitude of current may be obtained. Resistor 226 is provided with a variable feature to allow the operator to adjust for various ranges of current readings.

With the switches 20, 22, 50, 52, 78, 106 in the number five position, an ohmmeter is energized which is capable of measuring the resistance of any electrical component of the engine, as for example, coil resistance, or the circuit may be used to test for opens and shorts. With the switch 50 in position number five, the input circuit is through contactor to a resistor 228, and a conductor 230. Current then flows through the resistors 190, 188, internal direct current source 134, conductor 214, conductor 216 to position number five on input switch 52. The meter 74 is connected in parallel with the resistors 188, 190 wherein the current flowing through the resistors 188, 190, is measured by meter 74, the current being provided by internal direct current source 134. As will be seen from the foregoing circuit, the resistance to be measured is in series circuit with the resistors 188, 190 and the value of the resistance is utilized to vary the current flowing through the resistors 188, 190, thereby varying the reading on meter 74 in accordance therewith.

Referring now to the circuit at the time when switches 20, 22, 50, 52, 78, 106 are placed in a position in contact with contactor number six, it is seen that the same circuit is energized as was energized when the above mentioned switches were in position number five. However, the input circuit has been changed to include the connection of transducer 38 to the switches 20, 22 by means of conductors 40, 44 respectively.

As stated above, the transducer 38 may be of any suitable type which is adapted to vary the current passing through the circuit including the resistors 188, 190, 228. This transducer may take the form, as for example, of a resistance device which varies the value of the resistance in accordance with pressure or vacuum impressed thereon. Accordingly, with the transducer 38 sensing the value of pressure or vacuum, the current through the circuit, including the resistors 188, 190, 228 will be varied in accordance with the variation produced in transducer 38. As was in the situation in the circuit as described in conjunction with switch position five, the meter 74 is adapted to indicate the value of current passing through the resistors 188, 190 and accordingly will be responsive to the variations in transducer 38.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In an electrical testing apparatus, a plurality of test circuits, a multiscale meter common to the plurality of test circuits and operable when selectively switched to any one of said circuits to provide a test reading; said test circuits comprising a voltage measuring circuit including said meter for providing an output signal in accordance with the magnitude of an input voltage; a signal frequency measuring circuit including input circuit means adapted to be coupled to a source of recurrent signals, pulse producing circuit means for producing a series of constant energy pulses in response to said recurrent signals having a frequency which varies in accordance with the frequency of the recurrent signals, and integrating circuit means including said meter for integrating said constant energy pulses and producing a reading on said meter in accordance with the average value of said pulses over a predetermined period of time; a dwell indicating circuit including input circuit means for receiving a series of input pulses having a varying characteristic indicating the dwell, said input circuit means having series impedance means, said meter being connected in shunt circuit relative to said series impedance means for producing an average reading indicative of the variation of the characteristic; a current measuring circuit including input circuit means and adjustable impedance means in circuit with said meter for varying the current through said meter; an impedance measuring circuit for indicating the magnitude of an input impedance including a source of electrical energy, and impedance means in series circuit with the input impedance and in shunt circuit with said meter, said meter sensing the magnitude of current from said electrical energy source through said series impedance means; input conductor means; and switch means having a plurality of positions thereon for selectively actuating each of said plurality of circuits from said input conductor means.

2. In an electrical testing apparatus, a plurality of test circuits, a multiscale meter common to the plurality of test circuits and operable when selectively switched to any one of said circuits to provide a test reading; said test circuits comprising a voltage measuring circuit for providing an output signal in accordance with the magnitude of an input voltage, including resistance means in series with said meter for limiting the current through said meter; a signal frequency measuring circuit including input circuit means adapted to be coupled to a source of recurrent signals and extraneous signals having means for isolating the extraneous signals, pulse producing circuit means for producing a series of constant energy pulses in response to said recurrent signals having a frequency which varies in accordance with the frequency of the recurrent signals, differentiating means coupling said input circuit means to said pulse producing circuit means and integrating circuit means including said meter for integrating said constant energy pulses and producing a reading on said meter in accordance with the average value of said pulses over a predetermined period of time; a dwell indicating circuit including input circuit means for receiving a series of input pulses having a varying characteristic indicating the dwell, said input circuit means having series impedance means, said meter being connected in shunt circuit relative to said series impedance means for producing an average reading indicative of the variation of the characteristic; a current measuring circuit including input circuit means and adjustable impedance means in circuit with said meter for varying the current through said meter; an impedance measuring circuit for indicating the magnitude of an input impedance including a source of electrical energy, and impedance means in series circuit with the input impedance and in shunt circuit with said meter, said meter sensing the magnitude of current from said electrical energy source through said series impedance means; input conductor means; and switch means having a plurality of positions thereon for selectively actuating each of said plurality of circuits from said input conductor means.

3. In an electrical testing apparatus, a plurality of test circuits, a multiscale meter common to the plurality of test circuits and operable when selectively switched to any one of said circuits to provide a test reading; said test circuits comprising a voltage measuring circuit for providing an output signal in accordance with the magnitude of an input voltage, including resistance means in series with said meter for limiting the current through said meter and voltage limiting means in circuit with said meter for limiting the voltage applied to said meter, and scale impedance means for varying the full scale magnitude of the voltage to said meter; a signal frequency measuring circuit including input circuit means adapted to be coupled to a source of recurrent signals and extraneous signals having means for isolating the extraneous signals, pulse producing circuit means for producing a series of constant energy pulses in response to said recurrent signals having a frequency which varies in accordance with the frequency of the recurrent signals, differentiating means coupling said input circuit means to said pulse producing circuit means and integrating circuit means including said meter for integrating said constant energy pulses and producing a reading on said meter in accordance with the average value of said pulses over a predetermined period of time; a dwell indicating circuit including input circuit means for receiving a series of input pulses having a varying characteristic indicating the dwell, said input circuit means having series impedance means, said meter being connected in shunt circuit relative to said series impedance means for producing an average reading indicative of the variation of the characteristic; a current measuring circuit including input circuit means and adjustable impedance means in circuit with said meter for varying the current through said meter; an impedance measuring circuit for indicating the magnitude of an input impedance including a source of electrical energy, and impedance means in series circuit with the input impedance and in shunt circuit with said meter, said meter sensing the magnitude of current from said electrical energy source through said series impedance means; input conductor means and switch means having a plurality of positions thereon for selectively actuating each of said plurality of circuits from said input conductor means.

4. In an electrical testing apparatus, a plurality of test circuits, a multiscale meter common to the plurality of test circuits and operable when selectively switched to any one of said circuits to provide a test reading; said test circuits comprising a voltage measuring circuit for providing an output signal in accordance with the magnitude of an input voltage, including resistance means in series with said meter for limiting the current through said meter and voltage limiting means for limiting the voltage applied to said meter including semiconductor means connected in parallel circuit to said meter; said semiconductor means having characteristics such that the semiconductor means is nonconductive within a first range of voltages, is partially conductive within a second range of voltages and is fully conductive for a third range of voltages, and scale impedance means including an impedance and switch means for selectively switching said impedance in and out of circuit with said meter, a signal frequency measuring circuit including input circuit means adapted to be coupled to a source of recurrent signals and extraneous signals having means for isolating the extraneous signals, pulse producing circuit means for producing a series of constant energy pulses in response to said recurrent signals having a frequency which varies in accordance with the frequency of the recurrent signals, differentiating means coupling said input circuit means to said pulse producing circuit means and integrating circuit means including said meter for integrating said constant energy pulses and producing a reading on said meter in accordance with the average value of said pulses over a predetermined period of time; a dwell indicating circuit including input circuit means for receiving a series of input pulses having a varying characteristic indicating the dwell, said input circuit means having series impedance means, said meter being connected in shunt circuit relative to said series impedance means for producing an average reading indicative of the variation of the characteristic; a current measuring circuit including input circuit means and adjustable impedance means in circuit with said meter for varying the current through said meter; an impedance measuring circuit for indicating the magnitude of an input impedance including a source of electrical energy, and impedance means in series circuit with the input impedance and in shunt circuit with said meter, said meter sensing the magnitude of current from said electrical energy source through said series impedance means; input conductor means; and switch means having a plurality of positions thereon for selectively actuating each of said plurality of circuits from said input conductor means.

5. In an electrical testing apparatus, a plurality of test circuits, a multiscale meter common to the plurality of test circuits and operable when selectively switched to any one of said circuits to provide a test reading; said test circuits comprising a voltage measuring circuit for providing an output signal in accordance with the magnitude of an input voltage, including resistance means in series with said meter for limiting the current through said meter and resistance means in parallel circuit with said meter; a signal frequency measuring circuit including input circuit means adapted to be coupled to a source of recurrent signals and extraneous signals having transistor means connected in common emitter configuration for isolating the extraneous signals, pulse producing circuit means for producing a series of constant energy pulses in response to said recurrent signals having a frequency which varies in accordance with the frequency of the recurrent signals, differentiating means coupling said input circuit means to said pulse producing circuit means and integrating circuit means including said meter and said parallel circuit resistance means for integrating said constant energy pulses and producing a reading on said meter in accordance with the average value of said pulses over a predetermined period of time; a dwell indicating circuit including input circuit means for receiving a series of input pulses having a varying characteristic indicating the dwell, said input circuit means having series impedance means including said parallel circuit resistance means, said meter being connected in shunt circuit relative to said parallel circuit resistance means for producing an average reading indicative of the variation of the characteristic; a current measuring circuit including input circuit means and adjustable impedance means in circuit with said meter for varying the current through said meter; an impedance measuring circuit for indicating the magnitude of an input impedance including a source of electrical energy and said parallel circuit resistance means in series circuit with the input impedance and in shunt circuit with said meter, said meter sensing the magnitude of current from said electrical energy source through said series impedance means; input conductor means; and switch means having a plurality of positions thereon for selectively actuating each of said plurality of circuits from said input conductor means.

6. In an electrical testing apparatus, a plurality of test circuits, a multiscale meter common to the plurality of test circuits and operable when selectively switched to any one of said circuits to provide a test reading; said test circuits comprising a voltage measuring circuit for providing an output signal in accordance with the magnitude of an input voltage, including resistance means in series with said meter for limiting the current through said meter, and resistance means in parallel circuit with said meter; a signal frequency measuring circuit including input circuit means adapted to be coupled to a source of recurrent signals and extraneous signals having transistor means connected in a common emitter configuration in said input circuit for isolating the extraneous signals, monostable circuit means for producing a series of constant energy pulses in response to said recurrent signals having a frequency which varies in accordance with the frequency of the recurrent signals including first transistor means normally in a first conductive state and second transistor means normally in a second conductive state, said recurrent signals acting to switch said transistors to the other conductive state, differentiating means coupling said input circuit means to said monostable circuit means and integrating circuit means including said meter and said parallel circuit resistance means for integrating said constant energy pulses and producing a reading on said meter in accordance with the average value of said pulses over a predetermined period of time; a dwell indicating circuit including input circuit means for receiving a series of input pulses having a varying characteristic indicating the dwell, said input circuit means having series impedance means, including said parallel circuit resistance means, said meter being connected in shunt circuit relative to said parallel circuit resistance means for producing an average reading indicative of the variation of the characteristic; a current measuring circuit including input circuit means and adjustable impedance means in circuit with said meter for varying the current through said meter; an impedance measuring circuit for indicating the magnitude of an impedance including a source of electrical energy, and said parallel circuit resistance impedance means in series circuit with the input impedance and in shunt circuit with said meter, said meter sensing the magnitude of current from said electrical energy source through said series impedance means; input conductor means; and switch means having a plurality of positions thereon for selectively actuating each of said plurality of circuits from said input conductor means.

7. In an electrical testing apparatus, a plurality of test circuits, a multiscale meter common to the plurality of test circuits and operable when selectively switched to any one of said circuits to provide a test reading; said test circuits comprising a voltage measuring circuit for providing an output signal in accordance with the magnitude of one input voltage, including resistance means in series with said meter for limiting the current through said meter and resistance means in parallel circuit with said meter; a signal frequency measuring circuit including input circuit means adapted to be coupled to a source of recurrent signals and extraneous signals having transistor means connected in common emitter configuration in said input circuit for isolating the extraneous signals, monostable circuit means for producing a series of constant energy pulses in response to said recurrent signals having a frequency which varies in accordance with the frequency of the recurrent signals including first transistor means normally in a first conductive state and second transistor means normally in a second conductive state, said recurrent signals acting to switch said transistors to the other conductive state, said monostable circuit means including a timed impedance circuit having a charged and discharged state, one of said recurrent signals being adapted to cause said timed impedance circuit to change from one of said charged and discharged states to the other of said states when said first and second transistors are switched to the other of said conductive states, said transistors switching to said normal states when said timed impedance circuit reaches said other state, differentiating means coupling said input circuit means to said pulse producing circuit means and integrating circuit means including said meter for integrating said constant energy pulses and producing a reading on said meter in accordance with the average value of said pulses over a predetermined period of time; a dwell indicating circuit including input circuit means for receiving a series of input pulses having a varying characteristic indicating the dwell, said input circuit means having series impedance means, including said parallel circuit resistance means, said meter being connected in shunt circuit relative to said parallel circuit resistance means for producing an average reading indicative of the variation of the characteristic; a current measuring circuit including input circuit means and adjustable impedance means in circuit with said meter for varying the current through said meter; an impedance measuring circuit for indicating the magnitude of an input impedance including a source of electrical energy, and said parallel circuit resistance impedance means in series circuit with the input impedance and in shunt circuit with said meter, said meter sensing the magnitude of current from said electrical energy source through said series impedance means; input conductor means; and switch means having a plurality of positions thereon for selectively actuating each of said plurality of circuits from said input conductor means.

8. In an electrical testing apparatus, a plurality of test circuits, a multiscale meter common to the plurality of test circuits and operable when selectively switched to any one of said circuits to provide a test reading; said test circuits comprising a voltage measuring circuit for providing an output signal in accordance with the magnitude of an input voltage, including resistance means in series with said meter for limiting the current through said meter, and voltage limiting means in circuit with said meter for limiting the voltage applied to said meter, and scale impedance means for varying the full scale magnitude of the voltage to said meter; a signal frequency measuring circuit including input circuit means adapted to be coupled to a source of recurrent signals and extraneous signals having transistor means connected in common emitter configuration for isolating the extraneous signals, pulse producing circuit means for producing a series of constant energy pulses in response to said recurrent signals having a frequency which varies in accordance with the frequency of the recurrent signals, differentiating means coupling said input circuit means to said pulse producing circuit means and integrating circuit means including said meter and said parallel circuit resistance means for integrating said constant energy pulses and producing a reading on said meter in accordance with the average value of said pulses over a predetermined period of time; a dwell indicating circuit including input circuit means for receiving a series of input pulses having a varying characteristic indicating the dwell, said input circuit means having series impedance means including said parallel circuit resistance means, said meter being connected in shunt circuit relative to said parallel circuit resistance means for producing an average reading indicative of the variation of the characteristic; a current measuring circuit including input circuit means and adjustable impedance means in circuit with said meter for varying the current through said meter; an impedance measuring circuit for indicating the magnitude of an input impedance including a source of electrical energy and said parallel circuit resistance means in series circuit with the input impedance and in shunt circuit with said meter, said meter sensing the magnitude of current from said electrical energy source through said series impedance means; input conductor means; and switch means having a plurality of positions thereon for selectively actuating each of said plurality of circuits from said input conductor means.

9. In an electrical testing apparatus, a plurality of test circuits, a multiscale meter common to the plurality of test circuits and operable when selectively switched to any one of said circuits to provide a test reading; said test circuits comprising a voltage measuring circuit for providing an output signal in accordance with the magnitude of an input voltage, including resistance means in series with said meter for limiting the current through said meter, and voltage limiting means for limiting the voltage applied to said meter including semiconductor means connected in parallel circuit to said meter, said semiconductor means having characteristics such that the semiconductor means is nonconductive within a first range of voltages, is partially conductive within a second range of voltages and is fully conductive for a third range of voltages, and scale impedance means including an impedance and switch means for selectively switching said impedance in and out of circuit with said meter; a signal frequency measuring circuit including input circuit means adapted to be coupled to a source of recurrent signals and extraneous signals having transistor means connected in a common emitter configuration in said input circuit for isolating the extraneous signals, monostable circuit means for producing a series of constant energy pulses in response to said recurrent signals having a frequency which varies in accordance with the frequency of the recurrent signals including first transistor means normally in a first conductive state and second transistor means normally in a second conductive state, said recurrent signals acting to switch said transistors to the other conductive state, differentiating means coupling said input circuit means to said monostable circuit means and integrating circuit means including said meter and said parallel circuit resistance means for integrating said constant energy pulses and producing a reading on said meter in accordance with the average value of said pulses over a predetermined period of time; a dwell indicating circuit including input circuit means for receiving a series of input pulses having a varying characteristic indicating the dwell, said input circuit means having series impedance means, including said parallel circuit resistance means, said meter being connected in shunt circuit relative to said parallel circuit resistance means for producing an average reading indicative of the variation of the characteristic; a current measuring circuit including input circuit means and adjustable impedance means in circuit with said meter for varying the current through said meter; an impedance measuring circuit for indicating the magnitude of an impedance including a source of electrical energy, and said parallel circuit resistance impedance means in series circuit with the input impedance and in shunt circuit with said meter, said meter sensing the magnitude of current from said electrical energy source through said series impedance means; input conductor means; and switch means having a plurality of positions thereon for selectively actuating each of said plurality of circuits from said input conductor means.

10. In an electrical testing apparatus, a plurality of test circuits, a multiscale meter common to the plurality of test circuits and operable when selectively switched to any one of said circuits to provide a test reading; said test circuits comprising a voltage measuring circuit for providing an output signal in accordance with the magnitude of an input voltage, including resistance means in series with said meter for limiting the current through said meter, and voltage limiting means for limiting the voltage applied to said meter including semiconductor means connected in parallel circuit to said meter, said semiconductor means having characteristics such that the semiconductor means is nonconductive within a first range of voltages, is partially conductive within a second range of voltages and is fully conductive for a third range of voltages, and scale impedance means including an impedance and switch means for selectively switching said impedance in and out of circuit with said meter; a signal frequency measuring circuit including input circuit means adapted to be coupled to a source of recurrent signals and extraneous signals having transistor means connected in common emitter configuration in said input circuit for isolating the extraneous signals, monostable circuit means for producing a series of constant energy pulses in response to said recurrent signals having a frequency which varies in accordance with the frequency of the recurrent signals, including first transistor means normally in a first conductive state and second transistor means normally in a second conductive state, said recurrent signals acting to switch said transistors to the other conductive states, said monostable circuit means including a timed impedance circuit having a charged and discharged state, one of said recurrent signals being adapted to cause said timed impedance circuit to change from one of said charged and discharged states to the other of said states when said first and second transistors are switched to the other of said conductive states, said transistors switching to said normal states when said timed impedance circuit reaches said other state, differentiating means coupling said input circuit means to said pulse producing circuit means and integrating circuit means including said meter for integrating said constant energy pulses and producing a reading on said meter in accordance with the average value of said pulses over a predetermined period of time; a dwell indicating circuit including input circuit means for receiving a series of input pulses having a varying characteristic indicating the dwell, said input circuit means having series impedance means, including said parallel circuit resistance means, said meter being connected in shunt circuit relative to said parallel circuit resistance means for producing an average reading indicative of the variation of the characteristic; a current measuring circuit including input circuit means and adjustable impedance means in circuit with said meter for varying the current through said meter; an impedance measuring circuit for indicating the magnitude of an input impedance including a source of electrical energy, and said parallel circuit resistance impedance means in series circuit with the input impedance and in shunt circuit with said meter, said meter sensing the magnitude of current from said electrical energy source through said series impedance means; input conductor means; and switch means having a plurality of positions thereon for selectively actuating each of said plurality of circuits from said input conductor means.

References Cited

UNITED STATES PATENTS

| | | | |
|---|---|---|---|
| 3,058,062 | 10/1962 | Parmater | 324—73 |
| 3,158,804 | 11/1964 | Weissert | 324—15 |
| 3,300,713 | 1/1967 | Fulton | 324—73 XR |

RUDOLPH V. ROLINEC, *Primary Examiner.*

E. L. STOLARUN, *Assistant Examiner.*